United States Patent [19]

Sigl

[11] Patent Number: 5,423,601
[45] Date of Patent: Jun. 13, 1995

[54] ANTI-LOCK BRAKE SYSTEM AND DRIVE-SLIP CONTROL SYSTEM

[75] Inventor: Alfred Sigl, Sersheim, Germany

[73] Assignee: Robert Bosch GmbH, Stuttgart, Germany

[21] Appl. No.: 178,621
[22] PCT Filed: Sep. 13, 1990
[86] PCT No.: PCT/EP90/01559
§ 371 Date: Mar. 23, 1992
§ 102(e) Date: Mar. 23, 1992
[87] PCT Pub. No.: WO91/04892
PCT Pub. Date: Apr. 18, 1991

Related U.S. Application Data

[63] Continuation of Ser. No. 842,143, filed as PCT/EP90/01559, Sep. 13, 1990, abandoned.

[30] Foreign Application Priority Data

Oct. 9, 1989 [DE] Germany .............. 39 33 652.2

[51] Int. Cl.6 ............................................. B60T 8/58
[52] U.S. Cl. ............................... 303/100; 364/426.02
[58] Field of Search .............. 303/106, 103, 105, 108, 303/113 S; 180/282; 364/426.02, 426.3

[56] References Cited

U.S. PATENT DOCUMENTS

| | | |
|---|---|---|
| 3,752,251 | 8/1973 | Gaeke . |
| 4,610,483 | 9/1986 | Matsumoto et al. ............ 303/100 X |
| 4,850,656 | 7/1989 | Ise et al. ................ 303/103 X |
| 4,989,922 | 2/1991 | Pickenhahn et al. ............... 303/100 |
| 5,003,481 | 3/1991 | Matsuda ........................ 303/105 X |

FOREIGN PATENT DOCUMENTS

| | | |
|---|---|---|
| 0246790 | 11/1987 | European Pat. Off. . |
| 0274397 | 7/1988 | European Pat. Off. . |
| 3545546 | 7/1987 | Germany . |
| 3705983 | 9/1987 | Germany . |
| 3610184 | 10/1987 | Germany . |
| 3612170 | 10/1987 | Germany . |
| 3644139 | 7/1988 | Germany . |
| 3706514 | 9/1988 | Germany . |
| 3707235 | 9/1988 | Germany . |
| 3728574 | 11/1988 | Germany . |
| 3740433 | 6/1989 | Germany . |
| 8809276 | 12/1988 | WIPO . |

*Primary Examiner*—Andres Kashnikow
*Assistant Examiner*—Lee W. Young
*Attorney, Agent, or Firm*—Spencer, Frank & Schneider

[57] ABSTRACT

An anti-lock brake system and an anti-slip control system are described which are particularly favorable for cross-country driving, the vehicle deceleration or vehicle acceleration determined by way of the wheel speeds being compared with the vehicle deceleration or acceleration measured by way of a sensor. The incorrect measurement of the vehicle acceleration or deceleration caused by a downhill or uphill slope is recognized and used to change the controller in the direction of less sensitivity.

14 Claims, 1 Drawing Sheet

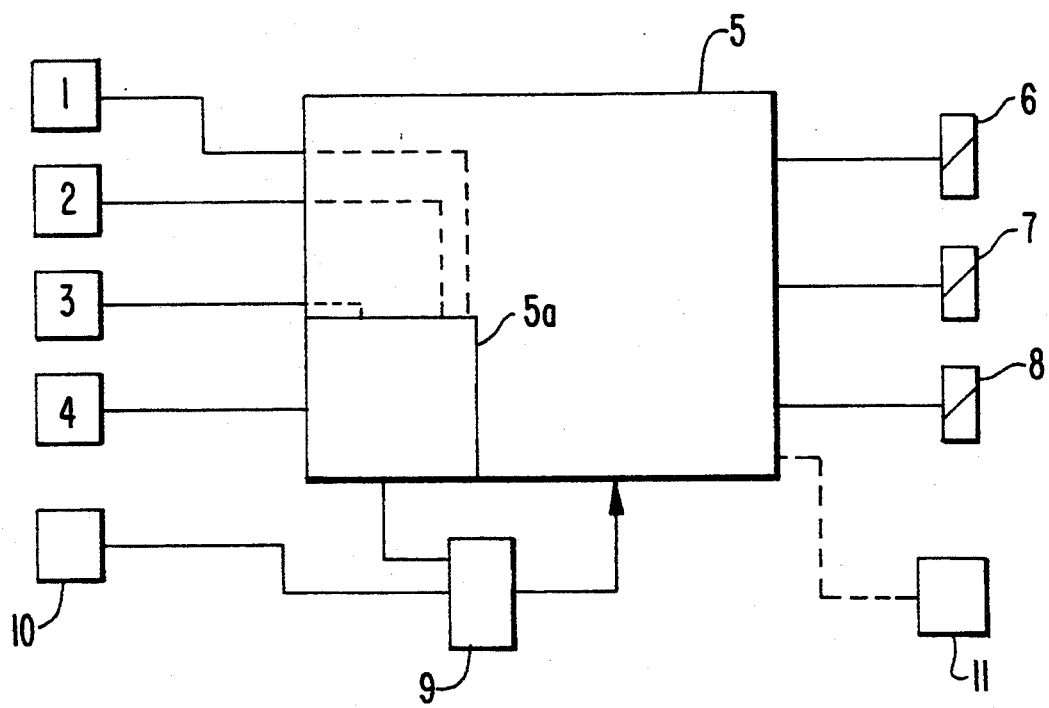

ANTI-LOCK BRAKE SYSTEM AND DRIVE-SLIP CONTROL SYSTEM

This application is a continuation of application Ser. No. 07/842,143, filed PCT/EP90/01559, Sep. 13, 1990, now abandoned.

STATE OF THE ART

An anti-lock brake system is known from the German Offenlegungsschrift 37 07 235 in which a reference speed curve is derived from the wheel speed signals, where the slope of the speed curve is a measure of a vehicle deceleration. The anti-lock brake system is installed in a vehicle in which all-wheel drive is used for at least part of the time. In the instability phases on low friction coefficients, the signal of a wheel deceleration signal generator supports the slope of the reference speed.

ADVANTAGES OF THE INVENTION

On flat road surfaces, vehicle deceleration calculated from wheel speeds agrees with the output signal of an acceleration sensor during an anti-lock brake system braking operation. Short-term perturbations of the acceleration sensor output signal—such as vehicle pitch motion—can be removed by appropriate filter design. If the measured and the calculated vehicle deceleration differ, the braking operation is taking place on an uphill or a downhill slope. The acceleration sensors used in the anti-lock brake system are based on the spring/mass principle, and therefore, measure a resultant of the vehicle acceleration and the vehicle attitude relative to the gravitational acceleration. If the vehicle is standing on a hill having, for example, a slope of 20%, the acceleration sensor indicates a measured value $A_1=0.19$ g, where $A_1 = g \cdot \sin \arctan P/100$ and P=slope in %.

In contrast to the normal anti-lock brake system arrangement, it is wise—particularly in the case of a large roadway slope condition—to give braking priority over driving stability. This applies even more as the calculated vehicle deceleration becomes less than the measured vehicle deceleration. A roadway slope can be recognized by an analysis of a difference between the calculated and measured deceleration and anti-lock brake system control strategies can be accordingly adapted.

If $A_1$ is the magnitude of the measured deceleration and $A_2$ is the magnitude of the deceleration calculated from the wheel speeds, the following relationship is formed:

$$\Delta A = |A_1| - A_2$$

A roadway slope condition is recognised if $A_1$, without brake actuation or $\Delta A$ in the case of brake actuation, becomes greater than a threshold value. The controller specifications, or parameters, are then switched, in or adjusted, an insensitive direction to improve the braking. Slip thresholds or deceleration thresholds can, for example, be set at a high level, but also the thresholds can be set, or a combination, of values. It is also, however, possible to include $\Delta A$ in an analog manner in the calculation of instability or slip equations, more slip being permitted for a larger $\Delta A$.

The teaching of the invention is also applicable to anti-slip control. The braking or traction can be improved by switching over an anti-lock brake system/anti-slip control system control strategy in the situation of large roadway downhill and uphill slopes, particularly in the case of a soft surface. This is particularly important in the case of all-terrain vehicles. Up to now, a switch operated by the driver has been provided for these vehicles. By way of the A sensor, the system is switched over automatically. For the above vehicles, an A sensor is usually necessary in any case because of the all-wheel concept.

The invention is explained in more detail by way of the illustrative example shown in the drawing.

In the drawing, four wheel speed measured value signal generators are indicated by 1 to 4. Their signals are supplied to an anti-lock brake system analysis circuit 5 which varies the pressure at the wheel brakes by way of brake pressure control valves 6–8 when there is a tendency to lock.

The reference speed $V_{Ref}$ necessary for the slip calculation is formed in a part 5a of the analysis circuit. The slope of the reference speed curve is a measure of the vehicle deceleration. The part 5a supplies a corresponding vehicle deceleration signal to a comparator 9 to which is also supplied the signal of a vehicle decelerometer 10. In a first embodiment, the comparator 9 emits a signal when $\Delta A = |A_1| - A_2$ exceeds a certain threshold. This signal then, for example, switches the slip and deceleration thresholds in the analysis circuit 5 to higher values. It is, however, also possible for the comparator to supply an analog signal corresponding to the value $\Delta A$ to the analysis circuit; this signal is then included in the slip and acceleration determination, for example, and, with increasing magnitude, decreases slip and acceleration determination signals. This also makes the controller less sensitive.

In the anti-slip control case, the reference speed is obtained by averaging the speeds of the non-driven wheels, for example. In this case, the vehicle acceleration measured in 10 is then compared with the slope of the reference speed determined in 5a and the control system is again made less sensitive in the case of a $\Delta A$ located above the threshold. In this case, an actuator 11 for changing the engine torque can be additionally included in the control system.

Another indication of cross-country travel is provided by the large wheel speed changes initiated by roadway irregularities. The recognition of a so-called poor roadway is within the state of the art. In the presence of a poor roadway, the influence of $\Delta A$ on the controller is increased.

I claim:
1. An anti-lock brake system comprising:
   at least one measured value signal generator for determining at least one wheel speed and producing at least one wheel speed signal,
   a vehicle deceleration signal generator for producing a measured vehicle deceleration signal $A_1$;
   an analysis circuit for processing the at least one wheel speed signal for producing a calculated vehicle deceleration signal $A_2$ and producing at least one wheel motion behavior signal based on a comparison of the measured vehicle deceleration signal $A_1$ and the calculated vehicle deceleration signal $A_2$; and
   at least one brake pressure control unit for varying a brake pressure in response to the at least one wheel motion behavior signal,
   wherein when the measured vehicle deceleration signal $A_1$ is greater than the calculated vehicle deceleration signal $A_2$ during a braking operation, a sensitivity threshold of the anti-lock brake system is changed making the anti-lock brake system less sensitive to a braking condition.

2. The anti-lock brake system according to claim 1, wherein the sensitivity threshold of the anti-lock brake system is changed to be less sensitive when the measured vehicle deceleration signal $A_1$ exceeds the vehicle deceleration signal $A_2$ by a predetermined amount $\Delta A$.

3. The anti-lock brake system according to claim 1, wherein a difference $\Delta A$ between the measured vehicle deceleration $A_1$ signal and the calculated vehicle deceleration $A_2$ signal is formed and used for determining an instability criterion for the anti-lock brake system.

4. The anti-lock brake system according to claim 1, further comprising a drive-slip control system, coupled to the at least one measured value signal generator and the vehicle deceleration signal generator, for controlling a drive-slip of the at least one wheel based on a difference $\Delta A$ between the measured vehicle deceleration signal $A_1$ and the calculated vehicle deceleration signal $A_2$, wherein when a poor roadway condition is detected, an influence of $\Delta A$ on the drive-slip of the at least one wheel controlled by the drive-slip control system is increased.

5. An anti-lock brake system comprising:
at least one measured value signal generator for determining at least one wheel speed and producing at least one wheel speed signal,
a vehicle deceleration signal generator for producing a measured vehicle deceleration signal $A_1$;
an analysis circuit for processing the at least one wheel speed signal for producing a calculated vehicle deceleration signal $A_2$, for producing comparison signal based on the measured vehicle deceleration signal $A_1$ and the calculated vehicle deceleration signal $A_2$, and for determining at least one wheel motion behavior signal based on a magnitude of the measured vehicle deceleration signal $A_1$ and a magnitude of the calculated vehicle deceleration signal $A_2$, and with the magnitude of the measured vehicle deceleration signal $A_2$ being controlled by the comparison signal for varying an influence of the magnitude of the measured vehicle deceleration signal $A_1$ and the magnitude of the calculated vehicle deceleration signals $A_2$ on the determination of the at least one wheel motion behavior signal; and
at least one brake pressure control unit for varying a brake pressure in response to the at least one wheel motion behavior signal,
wherein when the measured vehicle deceleration signal $A_1$ is greater than the calculated vehicle deceleration signal $A_2$ during a braking operation, the influence of the magnitude of the measured vehicle deceleration signal $A_1$ and the magnitude of the calculated vehicle deceleration signal $A_2$ on the determination of the at least one wheel motion behavior signal is reduced based on the comparison signal.

6. The anti-lock brake system according to claim 5, wherein the influence of the magnitude of the measured vehicle deceleration signal $A_1$ and the magnitude of the calculated vehicle deceleration signal $A_2$ on the determination of the at least one wheel motion behavior signal is reduced when the measured vehicle deceleration signal $A_1$ exceeds the vehicle deceleration signal $A_2$ by a predetermined amount $\Delta A$.

7. The anti-lock brake system according to claim 5, wherein a difference $\Delta A$ between the measured vehicle deceleration $A_1$ signal and the calculated vehicle deceleration $A_2$ signal is formed and used for determining an instability criterion for the anti-lock brake system.

8. The anti-lock brake system according to claim 5, further comprising a drive-slip control system, coupled to the at least one measured value signal generator and the vehicle deceleration signal generator, for controlling a drive-slip of the at least one wheel based on a difference $\Delta A$ between the measured vehicle deceleration signal $A_1$, and the calculated vehicle deceleration signal $A_2$, and wherein when a poor roadway condition is detected, an influence of $\Delta A$ on the drive-slip of the at least one wheel controlled by the drive-slip control system is increased.

9. An anti-lock brake system comprising:
at least one measured value signal generator for determining at least one wheel speed and producing at least one wheel speed signal,
a vehicle deceleration signal generator for producing a measured vehicle deceleration signal $A_1$;
an analysis circuit for processing the at least one wheel speed signal for producing a calculated vehicle deceleration signal $A_2$, the analysis circuit including means for controlling a sensitivity of the system to a braking condition, the analysis circuit further producing at least one wheel motion behavior signal based on a comparison of the measured vehicle deceleration signal $A_1$, the calculated vehicle deceleration signal $A_2$ and the sensitivity of the system; and
at least one brake pressure control unit for varying a brake pressure in response to the at least one wheel motion behavior signal,
wherein the means for controlling a sensitivity of the system is responsive to the measured vehicle deceleration signal $A_1$ being greater than the calculated vehicle deceleration signal $A_2$ during a braking operation to make the anti-lock brake system braking condition.

10. The anti-lock brake system according to claim 9, wherein the means for controlling a sensitivity of the system controls the sensitivity by changing a threshold.

11. The anti-lock brake system according to claim 9, wherein the means for controlling a sensitivity of the system controls the sensitivity in an analog manner.

12. The anti-lock brake system according to claim 9, wherein the sensitivity is controlled by the means for controlling a sensitivity of the system to be less sensitive when the measured vehicle deceleration signal $A_1$ exceeds the vehicle deceleration signal $A_2$ by a predetermined amount $\Delta A$.

13. The anti-lock brake system according to claim 9, wherein a difference $\Delta A$ between the measured vehicle deceleration $A_1$ signal and the calculated vehicle deceleration $A_2$ signal is formed and used for determining an instability criterion for the anti-lock brake system.

14. The anti-lock brake system according to claim 9, further comprising a drive-slip control system, coupled to the at least one measured value signal generator and the vehicle deceleration signal generator, for controlling a drive-slip of the at least one wheel based on a difference $\Delta A$ between the measured vehicle deceleration signal $A_1$ and the calculated vehicle deceleration signal $A_2$; and wherein when a poor roadway condition is detected, an influence of $\Delta A$ on the drive slip of the at least one wheel controlled by the drive-slip-control system is increased.

* * * * *